3,097,129
VOLATILE SOLID INSECTICIDAL AND BACTERICIDAL COMPOSITION

Louis A. Laffetay, Paris, and Auguste M. Boutin, Issy-les-Moulineaux, France, assignors to Progil, S.A., Rhone, France, a corporation of France
No Drawing. Filed Apr. 19, 1961, Ser. No. 104,005
Claims priority, application France Apr. 22, 1960
8 Claims. (Cl. 167—30)

This invention relates to a volatile solid composition giving off vapors having balanced insecticidal and bactericidal properties. More particularly, the invention relates to a solid composition containing paradichlorobenzene, as an insecticide, in admixture with a less volatile bactericide and with an ingredient imparting to the less volatile bactericide a volatility approximately the same as the volatility of the paradichlorobenzene.

The inexpensiveness, the deodorizing and the insecticidal properties of paradichlorobenzene are well known. The fact that paradichlorobenzene is a relatively volatile solid having a substantial vapor pressure at room temperature under atmospheric conditions and readily sublime under those conditions permits its most favorable use in the solid state as an insecticidal and deodorizing agent. It is available in many solid forms and it is used commercially in the form of powders, grains, pellets, blocks, etc. If desired, these solid forms may be perfumed or colored. For example, paradichlorobenzene has been used in all of the aforesaid forms by placing or hanging it in wardrobes or other enclosed spaces to protect clothing against insects and especially against moths. Paradichlorobenzene has likewise been used in the aforesaid forms as a deodorizing agent. The volatility of paradichlorobenzene is readily appreciated when it is recognized that a solid block of the material containing 100 g. completely sublimed in the atmosphere in approximately five weeks.

Although paradichlorobenzene is an especially valuable insecticide and deodorizing agent due to the foresaid characteristic, it has little or no bactericidal properties. It is apparent that a solid composition having the volatility characteristics of paradichlorobenzene but possessing both insecticidal and bactericidal properties would be a very valuable product. Yet applicants know of no other solid composition.

It is a principal object of the present invention to provide a solid composition having balanced insecticidal and bactericidal properties and possessing the physical characteristics of paradichlorobenzene. Other objects and features of the invention will be apparent from the more detailed description which follows.

It has now been found that a number of bactericides can be mixed with paradichlorobenzene and yet provide a volatile solid composition giving off vapors with balanced bactericidal and insecticidal properties by incorporating with the mixture a volatility imparting substance which will impart to the bactericide volatility characteristics approximating those of paradichlorobenzene. Substituted cyclohexanols and substituted cyclohexanones have proven particularly advantageous volatility imparting substances, especially for bactericides having less volatility than paradichlorobenzene. Cyclohexanols and cyclohexanones substituted by low molecular alkyl groups have proven very practical from an economic viewpoint and are very efficacious. Substituted cyclohexanols and substituted cyclohexanones possess certain bactericidal properties of their own and their use has the added advantage that they impart these added characteristics to the composition of this invention together with the balanced volatility characteristics. If desired, mixtures of substituted cyclohexanols and cyclohexanones may be used.

Among the bactericides which are compatible with the paradichlorobenzene and may be incorporated therewith together with substituted cyclohexanones or substituted cyclohexanols to provide a volatile solid releasing vapor having about the same compositions as the original solids are the following: polychlorophenols, polyoxymethylenes, epoxyphenols, formaldehyde and other aldehydric bactericides and the like. Generally speaking, these insecticides typically have too weak a vapor pressure under atmospheric conditions to create an atmosphere toxic to bacteria in a reasonable length of time.

As is the case with paradichlorobenzene itself, the compositions of this invention may be mixed with perfumes which may or may not have antiseptic properties of their own and which may, when they are volatilized off carry with them the other constituents in the composition. Likewise, coloring materials may be blended into the mixture hereof as is the case with paradichlorobenzene. Also the compositions of this invention may be used in the same solid form as paradichlorobenzene has heretofore been used for disinfecting clothes and for other purposes stated above by hanging them in wardrobes, vestibules and in other appropriate places.

The invention will be further understood from the following illustrative examples.

Example 1

The following materials were melted together:

| | Grams |
|---|---|
| Paradichlorobenzene | 96.0 |
| 2,4,5-trichlorophenol | 3.0 |
| 3,3,5-trimethylcyclohexanone | 1.0 |

The mixture, after cooling and shaping, was suitable for marketing in the form of powder, grains, flakes, pellets, blocks, etc. Such a mixture when used in the forms previously used for paradichlorobenzene evaporated regularly, keeping a constant bactericidal efficiency during its sublimation. The bactericidal efficiency was evidenced by the fact that microbial bodies of *Staphylococcus aureus* were killed in several hours by exposure to this mixture-vapors.

On the other hand:

| | Parts by weight |
|---|---|
| Paradichlorobenzene | 97.0 |
| 2,4,5-trichlorophenol | 3.0 | were melted together and shaped as above. Cakes weighing 100 g. were left in the open air for 6 weeks. All the paradichlorobenzene became volatilized and there remained a light carcass, consisting about 98% of the weight of the 2,4,5-trichlorophenol. Obviously, therefore, the bactericidal effect of the 2,4,5-trichlorophenol is not available in the vapors given off during this 6 week period. Thus the advantage of the presence of the 3,3,5-trimethylcyclohexanone is clearly seen.

Example 2

The following materials were melted together:

| | Grams |
|---|---|
| Paradichlorobenzene | 96.0 |
| 2,4,5-trichlorophenol | 3.0 |
| 3,3,5-trimethylcyclohexanol | 1.0 |

The mixture was cooled and shaped and may be marketed in the same manner as in Example 1.

Example 3

The following materials were melted together:

| | G. |
|---|---|
| Paradichlorobenzene | 95.8 |
| 2,4,5-trichlorophenol | 3.0 |
| Lindane (gamma isomer) | 0.2 |
| 3,3,5-trimethylcyclohexanone | 1.0 |

The mixture was cooled and shaped and may be marketed in the same manner as in Example 1.

Lindane is the commercial designation for 1,2,3,4,5,6-hexachlorocyclohexane.

*Example 4*

The following materials were melted together:

|  | G. |
|---|---|
| Paradichlorobenzene | 95.4 |
| 2,4,5-trichlorophenol | 3.0 |
| 3,3,5-trimethylcyclohexanone | 1.0 |
| Suitable coloring matter and perfume | 0.6 |

This mixture was cooled and shaped and may be marketed as indicated in Example 1.

*Example 5*

The following materials were blended without making them melt:

|  | G. |
|---|---|
| Paradichlorobenzene | 96.0 |
| 3,3,5-trimethylcyclohexanone | 1.0 |
| Trioxymethylene | 3.0 |

The mixture was cooled and pelletized and the compressed resulting blocks constituted a valuable and marketable composition as indicated in Example 1.

As is true of the above examples, such mixtures, when presented in whatever desired solid form evaporated regularly, keeping a constant bactericidal efficiency during all period of sublimation.

On the other hand:

|  | Parts by weight |
|---|---|
| Paradichlorobenzene | 98.0 |
| Trioxymethylene | 2.0 | were melted together and shaped as above. Cakes weighing 100 g. were left in the open air during 6 weeks. All the paradichlorobenzene became volatilized and there remained a light carcass constituting 98.5% of the weight of the trioxymethylene. So, again, the advantage of the presence of 3,3,5-trimethylcyclohexanone is seen.

While the foregoing specific examples have related to the utilization of particular bactericides having volatilities substantially different from the volatility of paradichlorobenzene, it will be understood that the specific bactericides are purely illustrative and that a variety of other bactericides having a volatility less than the volatility of paradichlorobenzene may be used in the solid compositions hereof and yet have their volatilities adjusted to substantially the same as that of paradichlorobenzene by the addition of substituted cyclohexanones or substituted cyclohexanols or mixtures thereof. Likewise, cyclohexanones and cyclohexanols substituted by specific low molecular alkyl groups have been disclosed as suitable for imparting the desired volatility characteristics to the specific bactericides used. Other substituted cyclohexanones and cyclohexanols may be used to impart desired volatility characteristics to other bactericides such as 3- or 4-methylcyclohexanol, 2-methylcyclohexanone, 2,5dimethylcyclohexanone.

Although the present invention has been described in connection with specific solid compositions providing vapors having balanced insecticidal and bactericidal properties, it will be understood that variations and modifications in the details of the invention may be made, such as the utilization of other bactericides and the utilization of other correspondingly appropriate volatility imparting ingredients, without departing from the spirit of the invention or its scope as defined in the appended claims.

What is claimed is.

1. A volatile solid composition releasing vapors having balanced insecticidal and bactericidal properties, comprising paradichlorobenzene, a bactericide having a volatility differing substantially from that of paradichlorobenzene and a substance imparting to said bactericide a volatility substantially the same as that of paradichlorobenzene selected from the group consisting of a substituted cyclohexanol, a substituted cyclohexanone and mixtures thereof.

2. A volatile solid composition releasing vapors having balanced insecticidal and bactericidal properties, comprising paradichlorobenzene, a bactericide having a volatility substantially less than that of paradichlorobenzene and a substance imparting to said bactericide a volatility substantially the same as that of paradichlorobenzene selected from the group consisting of a substituted cyclohexanol, a substituted cyclohexanone and mixtures thereof.

3. A volatile solid composition releasing vapors having balanced insecticidal and bactericidal properties, comprising paradichlorobenzene, a bactericide having a volatility differing substantially from that of paradichlorobenzene and a substituted cyclohexanol imparting to said bactericide a volatility substantially the same as that of paradichlorobenzene.

4. A volatile solid composition releasing vapors having balanced insecticidal and bactericidal properties, comprising paradichlorobenzene, a bactericide having a volatility differing substantially from that of paradichlorobenzene and a substituted cyclohexanone imparting to said bactericide a volatility substantially the same as that of paradichlorobenzene.

5. A volatile solid composition, comprising a mixture of paradichlorobenzene, a polychlorophenol bactericide, and a substituted cyclohexanone imparting to the mixture a volatility substantially the same as the volatility of paradichlorobenzene.

6. A volatile solid composition, comprising a mixture of paradichlorobenzene, a polychlorophenol bactericide, and a substituted cyclohexanol imparting to the mixture a volatility substantially the same as the volatility of paradichlorobenzene.

7. A volatile solid composition comprising a solid mixture of paradichlorobenzene, a polyoxymethylene bactericide and an alkyl substituted cyclohexanone, said solid mixture releasing vapors having about the same composition as said mixture.

8. A volatile solid composition comprising a solid mixture of paradichlorobenzene, a polychlorophenol bactericide and an alkyl substituted cyclohexanone, said solid mixture releasing vapors having about the same composition as said mixture.

References Cited in the file of this patent

UNITED STATES PATENTS

| 1,097,406 | Erlenbach | May 19, 1914 |
| 2,134,504 | Brodersen et al. | Oct. 25, 1938 |
| 2,217,358 | Coltof | Oct. 8, 1940 |
| 2,358,986 | McGovran et al. | Sept. 26, 1944 |
| 2,817,622 | Obladen et al. | Dec. 24, 1957 |
| 2,952,582 | Goodhue et al. | Sept. 13, 1960 |
| 2,961,375 | Shaw | Nov. 22, 1960 |